R. W. HAUBNER.
ANTISKID FOR WHEELS.
APPLICATION FILED MAY 26, 1917.

1,267,544.

Patented May 28, 1918.

INVENTOR:
Robert W. Haubner

By
HIS ATTORNEYS:

UNITED STATES PATENT OFFICE.

ROBERT W. HAUBNER, OF SOMERVILLE, MASSACHUSETTS, ASSIGNOR, BY MESNE ASSIGNMENTS, TO NON SKID COMPANY OF AMERICA, OF BOSTON, MASSACHUSETTS, A CORPORATION OF MASSACHUSETTS.

ANTISKID FOR WHEELS.

1,267,544.  Specification of Letters Patent.  Patented May 28, 1918.

Application filed May 26, 1917. Serial No. 171,240.

*To all whom it may concern:*

Be it known that I, ROBERT W. HAUBNER, of Somerville, in the county of Middlesex and State of Massachusetts, a citizen of the United States, have invented a new and useful Improvement in Antiskids for Wheels, of which the following is a full, clear, and exact description, reference being had to the accompanying drawings, forming a part of this specification, in explaining its nature.

The present invention relates to an antiskid device for wheels and especially the wheels, or rather the tire portion of the wheels, of motor vehicles. It comprises an improvement upon that type of antiskid device recently invented in which there is employed a cross-retaining member consisting preferably of a wire rope or cable attachable to a wheel or its rim to extend crosswise over the face of the tire and having arranged or strung upon it a plurality of rotative wear-resisting parts or elements generally tubular in form.

The essential object of the invention is to improve the antiskid device above referred to so that its wear-resisting elements may better perform the functions for which they are designed. In other words, it is my object to so improve the device that its wear-resisting elements may better (in the sense of more completely) protect the rope or cable upon which they are arranged as against wear; to so improve the device that the wear-resisting elements by supporting one another will prevent any one of the elements being so turned in relation to another or others of the elements by external blow or influence as to break the cable or lacerate it or the tire; to so improve the device that a glancing blow, which might otherwise tend to disrupt the device, may be harmlessly deflected; to so improve the device that the rotative action of the wear-resisting elements will be materially increased, and also to so improve the device that the wear-resisting elements by supporting one another will materially improve their tractive effect.

The invention can best be seen and understood by reference to the drawings in which I have shown it applied to the tire of an automobile, only such parts being shown as are necessary to a proper understanding of the invention.

Figure 1:
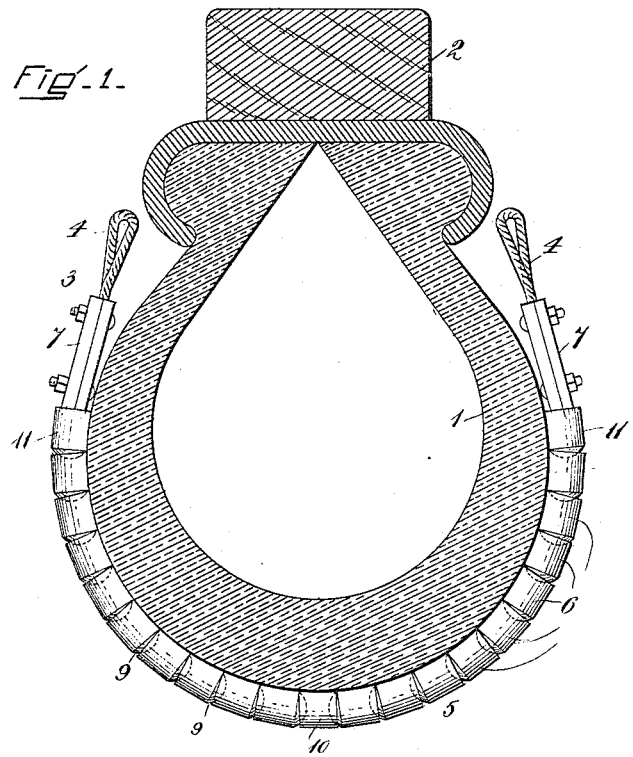
Figure 1 is a view partly in side elevation and partly in section showing a portion of a tire and my improved device applied to it.
Figure 2:
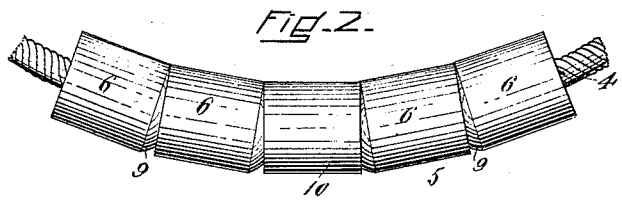
Fig. 2 is an enlarged side elevation of certain of the elements comprising the improved device as shown in Fig. 1.

1 represents a section of the tire, 2 the adjacent rim portion of the wheel and 3 the antiskid device embodying the improvement which comprises my invention.

The antiskid device 3 comprises a cross-retaining member 4 and a road-engaging member 5.

The cross-retaining member 4 is preferably a flexible member and one of great tensile strength. A wire rope or cable is found to be a most satisfactory cross-retaining member. The member or cable is bent around the tire to extend crosswise over the face thereof and the ends of the cable are secured to the wheel (not shown) upon which the rim 2 is arranged or to the rim itself by any suitable means of fastening (not shown) and which forms no part of my invention.

Arranged upon the cross-retaining member 4, forming a supporting core, are a series of wear-resisting elements 6 generally tubular in form, uncrushable and preferably composed of tough or hardened steel.

The extension of the elements 6 along the rope or cable is such as to cover all parts thereof as would have wearing contact with the road or otherwise be subjected to a disruptive lateral influence such as engagement thereof with a curbing. In practice, substantially the entire portion of the wire rope extending around and over the face of the tire is covered with the elements. The endwise displacement of the elements upon the rope is prevented by any suitable clip or stop 7 thereon or by such other means as is deemed advisable.

The general form and adaptability of the elements are such that they have a jointed relationship to one another. In other words, the elements are formed to fit into or interlock with one another so as to cover the rope or cable and leave no gaps when the cable is bent around the face of the tire. The jointed relationship between the elements is also a flexible relationship or such as will permit of the elements turning independently of one another as occasion may require. Such result is effected by the formation of a ball and socket joint between the elements and is best attained as shown by the countersinking or formation of a socket 8 in the end of one element and the preformation or beveling of the end 9 of the next adjacent element to fit into and turn within the socket (see Fig. 3). I prefer, also, that each of the sockets be slightly concave and the beveled end of the adjacent element or part fitting into the same be convex, in order to attain substantially the action of a ball and socket joint, or so that the elements may rotate independently of one another even when turned angularly in relation to one another as they must necessarily be turned in order to follow the "wrap" of the cable around the tire.

Figure 3:
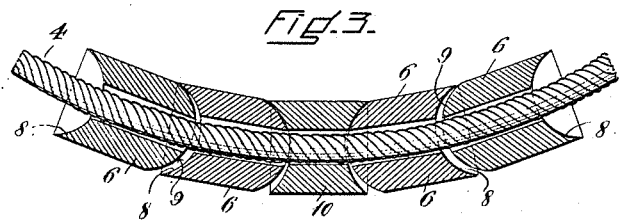
Fig. 3 is a vertical section of the parts shown in Fig. 2.

It will also be observed by reference to Fig. 3 that the central one 10 of the elements, or that element at the central part of the tire, is made with a socket 8 at either end, while the elements on either side thereof are formed with a ball at the inner end and a socket at the outer end excepting that the outermost ones 11 of the elements bearing against the stops have no sockets at their outer ends, as such are not required.

The general operation of, and advantages to be attained from, my invention in accordance with the objects of my invention, are as follows:—

In the first place it will be observed that all gaps between the elements are eliminated. In other words, throughout the extension of the elements the wire rope or cable is entirely covered and protected. Such elimination of gaps has the further advantage of preventing the elements lacerating the tire as might be the case when the elements and tire were subjected to a crushing strain. As the elements coördinate with one another a practically homogeneous surface is presented to the face of the tire. By their fitting into one another each of the elements supports the elements next adjacent it and prevents any one of the elements from being individually so turned as to shear the cable as might otherwise happen should extreme pressure be centralized upon some one of the elements. For the same reason any crushing effect brought to bear upon one element would also be borne in part by the elements next adjacent it. By having the sockets upon the ends of the elements extending from the common central element there is no possibility of some extraneous object engaging the end of any one of the elements so as to exert a disruptive influence upon the entire device. When, for example, the device is brought in contact with a curbstone the resultant wiping blow might disrupt the device if the curb could catch upon the end of any one of the elements. Related as they are, however, the curb must necessarily slip over the joints between the elements, for the ends of the elements with which the curb might otherwise have engagement are entirely protected by the socket-forming ends of the adjacent elements fitting over the same.

The rotative action of the elements is materially improved inasmuch as the elements have a substantially ball and socket union with one another which permits the proper rotation of any one of the elements whatever their relative angular position may be. In fact, apart from the considerations above noted, the tractive influence afforded by the elements or fundamental function performed by them is materially improved, inasmuch as the union between the elements enables them to support one another, resist slippage and exert a combined tractive effect.

Having thus fully described my invention, I claim and desire to secure by Letters Patent of the United States:—

1. An antiskid for wheels comprising a cross-retaining member extending over the face of the tire to the wheel and a plurality of generally tubular road-engaging and wear-resisting elements rotatably mounted upon said cross member, and which elements have jointed engagement with one another by the entering of an end of one into an end of the other next adjacent to it.

2. An antiskid for wheels comprising a cross-retaining member extending over the face of the tire to the wheel and a plurality of generally tubular road-engaging and wear-resisting elements rotatably mounted upon said cross member, and which elements have jointed engagement with one another by an end of one socketed to turn within an end of the other next adjacent to it.

3. An antiskid for wheels comprising a cross-retaining member extending over the face of the tire to the wheel and a plurality of generally tubular road-engaging and wear-resisting elements rotatably mounted upon said cross member, adjacent ones of said elements being provided one with a socket in an end thereof and the other with an end entering said socket.

4. An antiskid for wheels comprising a cross-retaining member extending over the face of the tire to the wheel and a plurality of generally tubular road-engaging and wear-resisting elements rotatably mounted upon said cross member, adjacent ones of which elements have substantially a ball and socket engagement with each other.

5. An antiskid for wheels comprising a cross-retaining member extending over the face of the tire to the wheel and a plurality of generally tubular road-engaging and wear-resisting elements rotatably mounted upon said cross member, adjacent ones of which elements are provided one with a socket in an end thereof made concave and the other with an end made convex to fit and turn within said socket.

6. An antiskid for wheels comprising a cross-retaining member extending over the face of the tire to the wheel and a plurality of generally tubular road-engaging and wear-resisting elements rotatably mounted upon said cross member, the outer ends of said elements in reverse directions away from the central portion of the combined elements being provided with sockets and the inner ends of said elements entering said sockets substantially as and for the purposes set forth.

ROBERT W. HAUBNER.